(12) United States Patent
Pfeiler

(10) Patent No.: US 8,561,952 B2
(45) Date of Patent: Oct. 22, 2013

(54) COLUMN ATTACHMENT

(76) Inventor: Mark Pfeiler, Chino, CA (US)

( * ) Notice: Subject to any disclaimer, the term of this patent is extended or adjusted under 35 U.S.C. 154(b) by 35 days.

(21) Appl. No.: 13/324,137

(22) Filed: Dec. 13, 2011

(65) Prior Publication Data

US 2013/0075556 A1 Mar. 28, 2013

Related U.S. Application Data

(60) Provisional application No. 61/538,668, filed on Sep. 23, 2011.

(51) Int. Cl.
*A47B 96/00* (2006.01)

(52) U.S. Cl.
USPC ........... 248/218.4; 248/221.11; 248/187.1; 248/299.1; 248/227.3; 396/428

(58) Field of Classification Search
USPC ........... 248/221.11, 218.4, 219.1, 126, 230.8, 248/219.4, 187.1, 235, 250, 227.3; 396/428
See application file for complete search history.

(56) References Cited

U.S. PATENT DOCUMENTS

| | | | | | |
|---|---|---|---|---|---|
| 110,434 | A | * | 12/1870 | Clarke | 248/515 |
| 257,050 | A | * | 4/1882 | Munson | 248/231.71 |
| 1,236,960 | A | * | 8/1917 | McMillan | 248/219.1 |
| 1,712,974 | A | * | 5/1929 | Venard | 248/245 |
| 1,935,246 | A | * | 11/1933 | Kirsch | 403/205 |
| 2,512,174 | A | * | 6/1950 | Roeder | 248/213 |
| 2,552,205 | A | * | 5/1951 | Moss | 224/259 |
| 2,614,861 | A | * | 10/1952 | Van Horn | 280/457 |
| 3,145,005 | A | * | 8/1964 | Wester | 248/515 |
| 3,985,326 | A | | 10/1976 | Kittstein | |
| 4,091,402 | A | * | 5/1978 | Siegel | 396/422 |
| 4,270,721 | A | | 6/1981 | Mainor, Jr. | |
| 4,474,439 | A | * | 10/1984 | Brown | 352/243 |
| 4,773,621 | A | * | 9/1988 | Gebhardt | 248/122.1 |
| 4,943,820 | A | * | 7/1990 | Larock | 396/423 |
| 5,385,536 | A | * | 1/1995 | Burkhead et al. | 602/20 |
| 5,497,214 | A | | 3/1996 | Labree | |
| 5,622,342 | A | | 4/1997 | Mills | |
| 5,632,461 | A | | 5/1997 | von Helms et al. | |
| 5,649,257 | A | * | 7/1997 | Kempka | 396/428 |
| 5,723,808 | A | | 3/1998 | Devall | |
| 5,771,991 | A | * | 6/1998 | Fresco | 182/82 |
| 6,045,103 | A | * | 4/2000 | Costa et al. | 248/278.1 |
| 6,349,905 | B1 | * | 2/2002 | Mills | 248/126 |
| 6,435,462 | B2 | * | 8/2002 | Hawes | 248/299.1 |
| 6,484,987 | B2 | * | 11/2002 | Weaver | 248/278.1 |
| 6,694,661 | B1 | | 2/2004 | Langford | |
| 7,165,750 | B2 | | 1/2007 | McCuskey et al. | |
| 7,341,507 | B1 | * | 3/2008 | Julian, Sr. | 452/192 |
| 7,546,990 | B1 | * | 6/2009 | McGuire | 248/111 |
| 7,771,131 | B2 | * | 8/2010 | Scott | 396/428 |
| 7,861,987 | B2 | | 1/2011 | Gorsuch et al. | |
| 8,302,922 | B1 | * | 11/2012 | Robinson | 248/219.4 |
| 2006/0197001 | A1 | * | 9/2006 | Parker et al. | 248/230.8 |

* cited by examiner

OTHER PUBLICATIONS http://www.surveying.com/Products/Construction-Lasers-and-Detectors/Lasers-and-Accessories/4852-15. Publication date unknown.

*Primary Examiner* — Terrell McKinnon
*Assistant Examiner* — Daniel J Breslin
(74) *Attorney, Agent, or Firm* — Law Office of Austin Bonderer, PC; Austin Bonderer

(57) ABSTRACT

A column attachment having an abutment, a platform, a tension member, and a securing element that are used to provide a stable support for a device. The tension member secures the platform to the abutment. The securing portion is able to slide along a slot defined in the platform. The securing portion is able to attach to devices, like total stations, and secure them to the platform.

12 Claims, 9 Drawing Sheets

COLUMN ATTACHMENT

FIELD OF THE INVENTION

The invention relates to portable stand that needs not touch the ground. The portable stand can serve as a stable platform for devices used in construction.

BACKGROUND OF THE INVENTION

During construction, constant measurements must be taken to insure that the structure is adhering to the design being built. Many times a scanner and/or total stations are used to take these measurements. A total station is an electronic/optical instrument used in modern surveying. The total station is an electronic theodolite (transit) integrated with an electronic distance meter (EDM) to read distances from the instrument to a particular point.

The total station, and most all other devices, need to be stable in order to make precise measurements. However, in many situations, the surface near where the device must be set does not allow a tripod to provide a stable surface. Other times it is just inconvenient or very difficult to use a tripod due to the state of the surface. In some cases, metal or wood decking is set as a form before the concrete floors are poured which is not a stable footing for a tripod.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
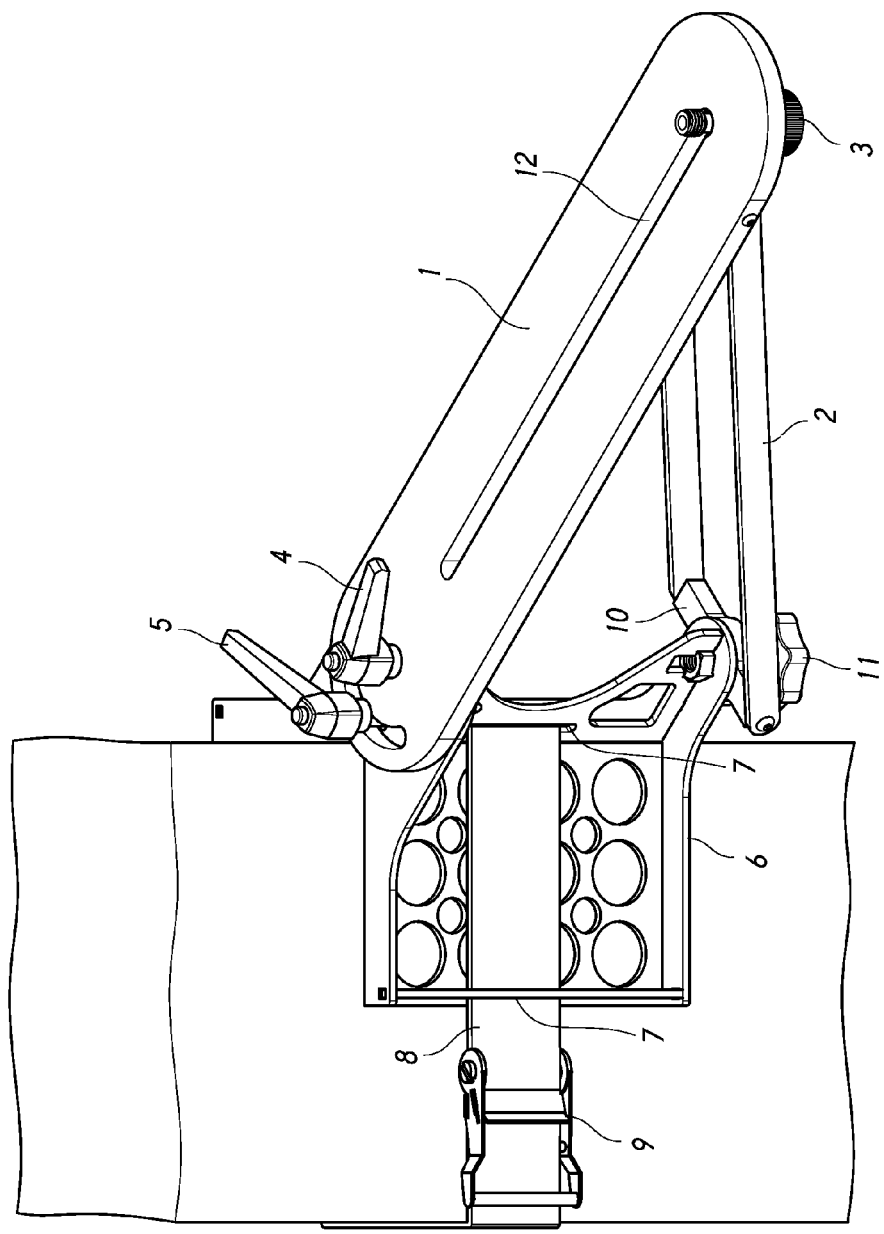
FIG. 1 shows an embodiment of a column attachment secured to a square column.
Figure 2:
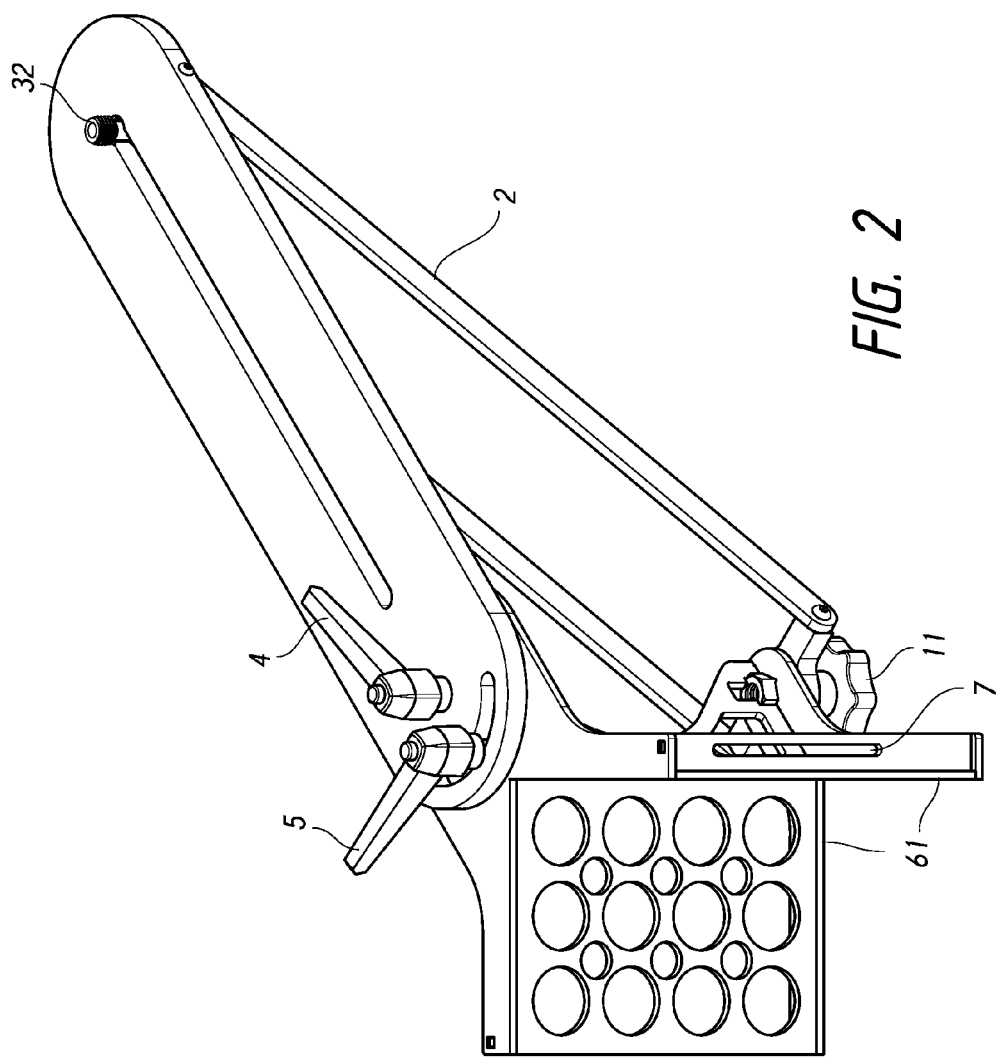
FIGS. 2-7 shows different perspectives of the an embodiment of the column attachment.
Figure 3:
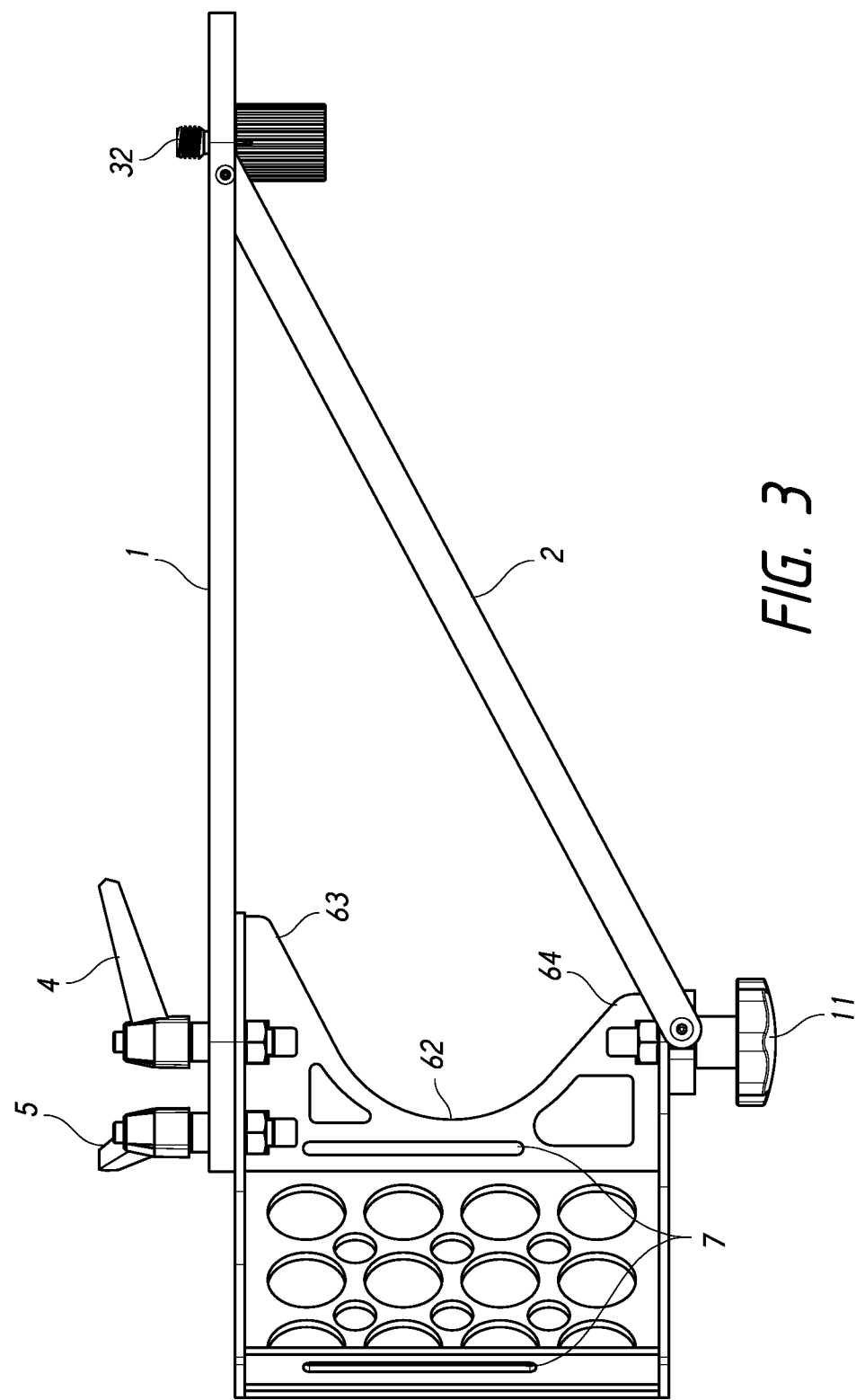
Figure 4:
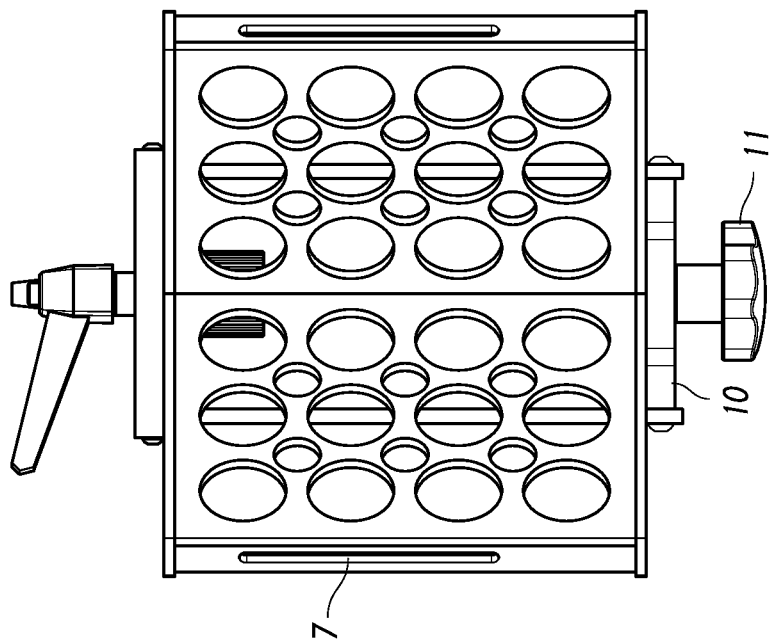
Figure 5:
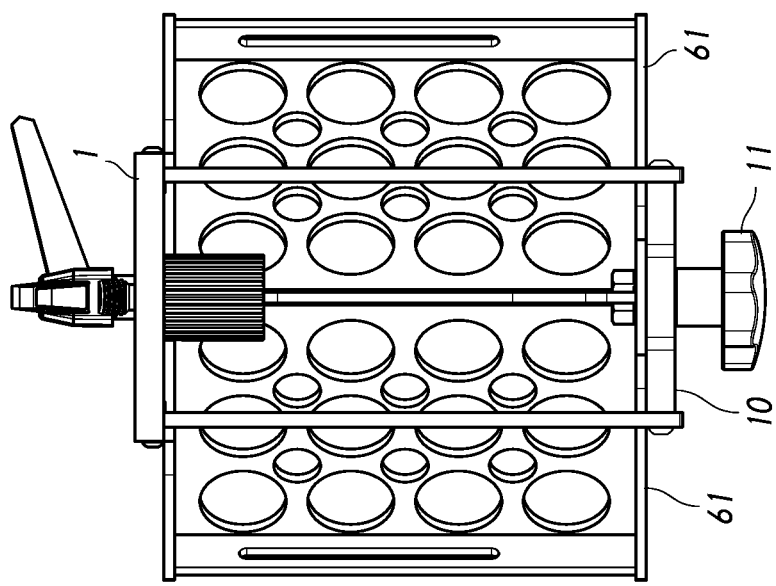
Figure 6:
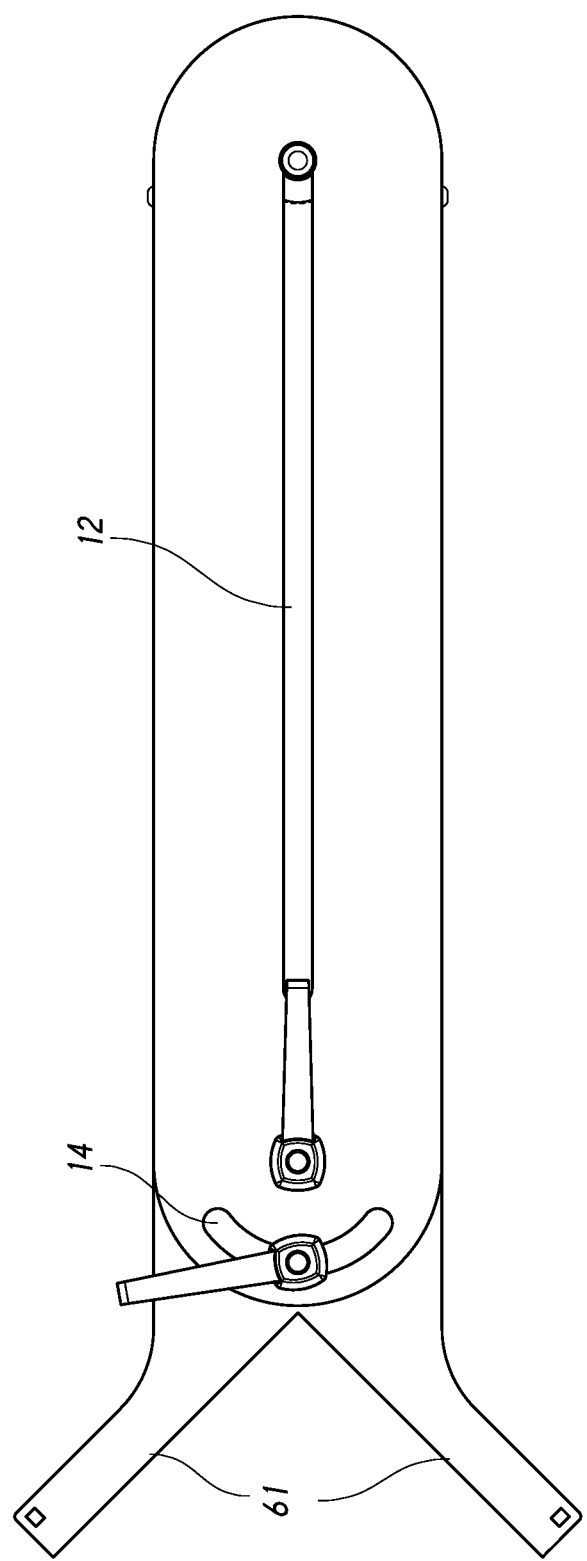
Figure 7:
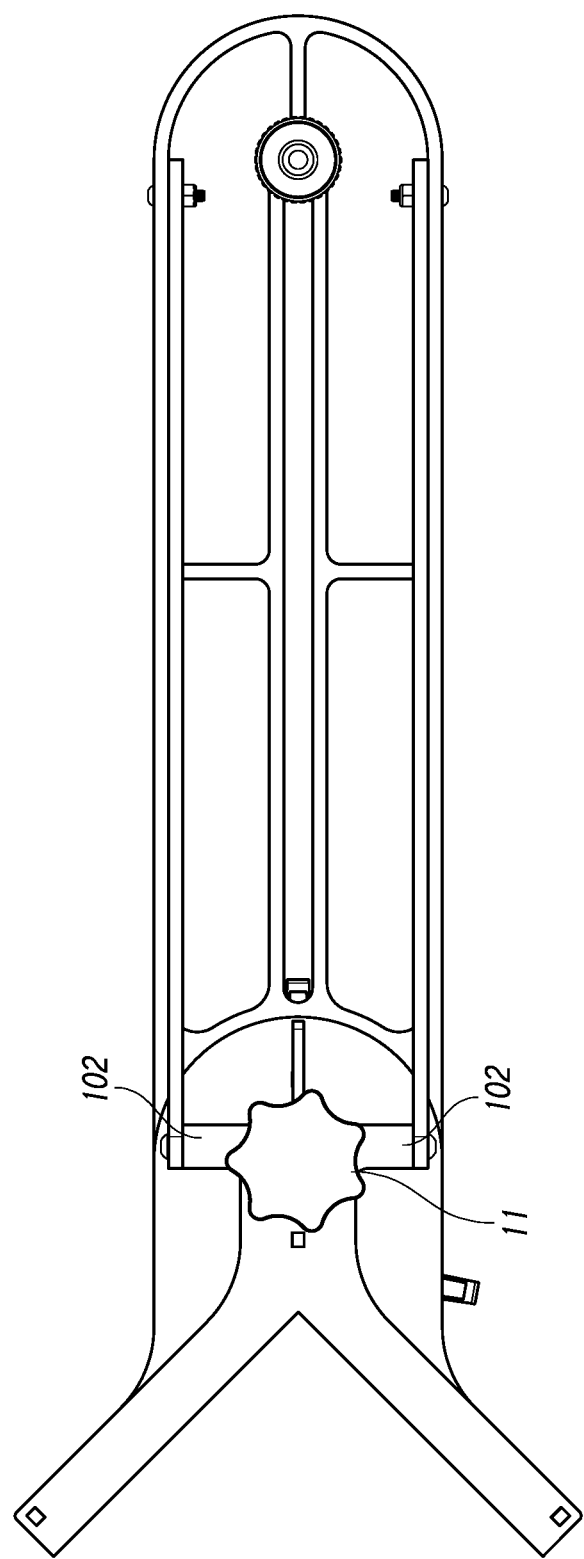

Referring to FIG. 1, the platform 1 is secured to the abutment 6 by one or more tension members and the lower support element 10. The one or more tension members can include a center tension member 4 and a periphery tension member 5. The abutment 6 can have one or more strap accepting sections 7. A strap 8 can be run through the strap accepting sections 7 and secured tightly to a column, post or other suitable object. The strap 8 can be tightened by a strap tensioning member 9 so as to firmly secure the abutment 6 to the column, post or other suitable object. The securing element 3 can be used to secure a device against the platform 1.

Figure 8:
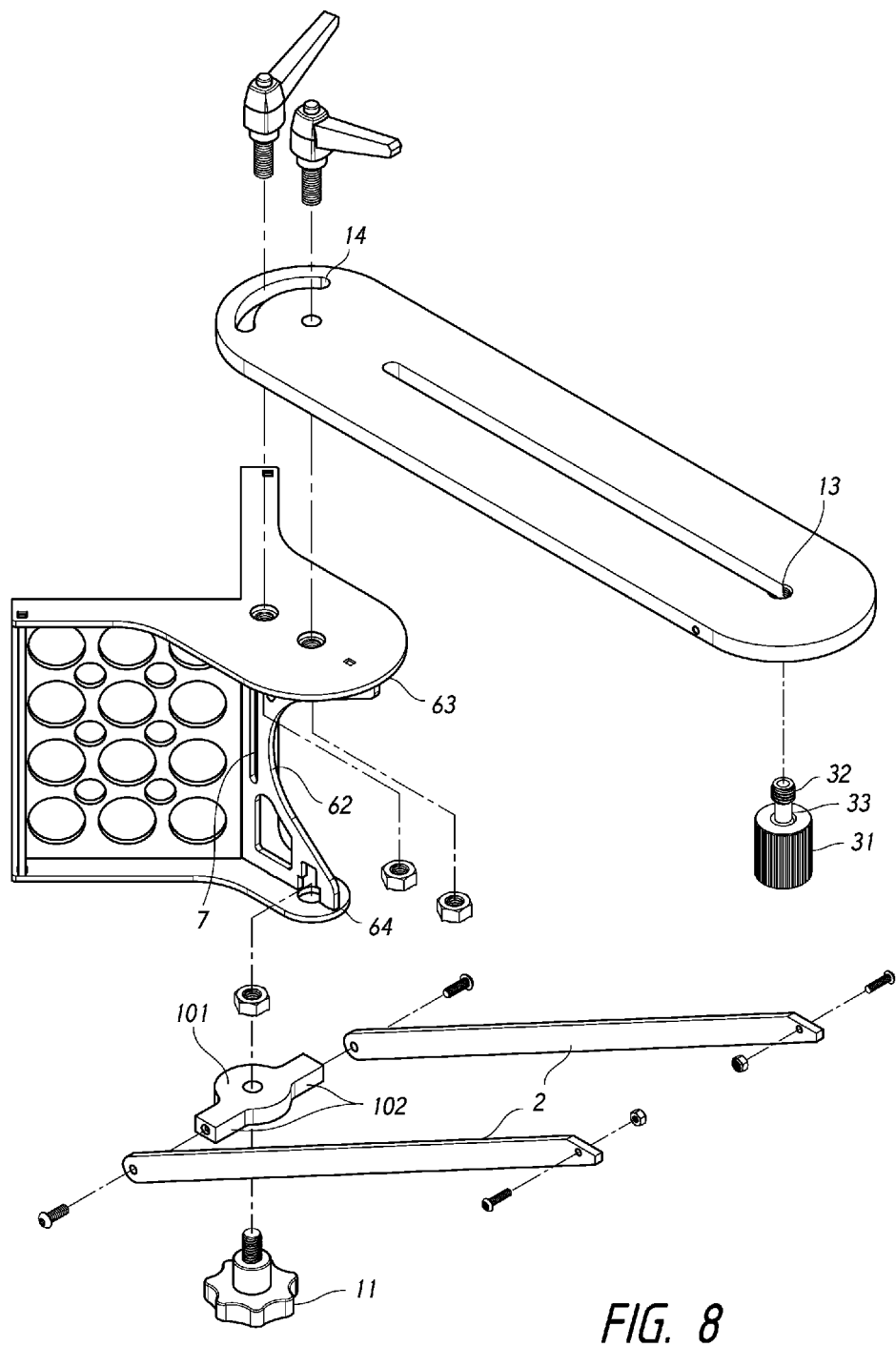
FIG. 8 shows an exploded view of an embodiment of the column attachment.

Referring to FIG. 8, the securing element 3 can have a gripping portion 31, a securing portion 32 and a neck 33. The securing portion 32 can be threaded and have a size and a thread that corresponds to standard threaded holes of devices used in surveying, construction or photography. The securing portion 32 can have a #8-32 thread. Different securing elements 3 can be supplied to correspond to different devices. The length of the securing portion 32 can be shorter than the accommodating space in the device. Thus the securing portion 32 can be secured to the device, have the device press against the platform 1, and have the gripping portion 31 press against the underside of the platform 1. This will stabilize the device on the platform 1. The neck 33 is of a size that will allow it to slide along the slot 12, while the securing portion 32 has an effective circumference that will prevent it from slipping through the slot 12. The gripping portion 31 can be any number of designs. As shown, the gripping portion 31 is a cylinder with grooves to increase friction. In other embodiments a knob or other handles can be used as the gripping portion 31.

The platform 1 defines a slot 12 that allows for adjusting the location of the device along the platform 1. The slot 12 can be in communication with the platform through hole 13. The platform through hole 13 can have a thread that corresponds to the securing portion 32. In other embodiments, the through hole 13 need not be threaded. The through hole 13 allows the securing element 3 to be removed. In some embodiments, the platform 1 does not have a through hole 13, and the securing element 3 is retained by and able to move along the slot 12. The platform 1 can also define a curved slot 14. The curved slot 14 allows the platform to move relative to the periphery tension member 5 so as to rotate the platform 1. The platform can also define an aperture through which the center tension member 4 extends to engage the abutment 6.

The lower support element 10 comprises a base 101 and one or more arms 102 extending from the base 101. The lower support element 10 is secured to the abutment 6 by a lower tightening member 11. The lower tightening member 11 is able to increase the pressure between the lower support element 10 and the abutment 6. Thus the relative movement between the abutment 6 and the lower support element 10 is limited. Each arm 102 can have one or more braces 2 attached thereto. In the embodiment shown in FIG. 1, the lower support element 10 comprises two arms 102 extending from a rounded base 101, and a brace 2 is attached to each arm 102. In other embodiments, there is only one arm 102 with one or more braces 2 attached thereto. The base 101 can have a shape that corresponds to a portion of the abutment 6 so as to maximize the contact surface area between the lower support element 10 and the abutment 6. The amount of contact surface area will influence the rotational stability of the platform 1. The amount of contact surface area and/or the friction thereof can be set as desired. In some embodiments, there are no arms extending from the base 101.

The lower tightening member 11 can have a threaded portion 111 that corresponds to a threaded element located on the abutment 6. The lower tightening member 11 also has a handle portion 112. The handle portion 112 can be an adjustable clamping lever or a knob.

The platform 1 is connected to one or more braces 2. As seen in FIG. 1, the two braces 2 extend from the lower support element 10 to the platform 1. In other embodiments, the one or more braces 2 can be connected to the base 101.

Referring to FIGS. 2 to 6, the abutment 6 comprises two projections 61 that extend from a center portion 62. The two projections 61 can define an angle. The angle can be in the range from about 45 degrees to about 180 degrees. In some embodiments, the angle is about 90 degrees as shown in the drawings. The projections 61 can have a solid surface or define multiple apertures to decrease the weight. The center portion 62 has an upper portion 63 and lower portion 64. The upper portion 63 defines two receiving holes that can accept portions of the center tension member 4 and the periphery tension member 5.

In some embodiments, the receiving holes and the portions have corresponding threads, such that when the center tension member 4 and/or the periphery tension member 5 are tightened, the platform 1 is pressed against the upper portion 63. In some embodiments, a nut is what supplies the corresponding thread. The nut may or may not be secured to the abutment 6. When the center tension member 4 and/or the periphery tension member 5 is tightened sufficiently, the rotational stability of the platform 1 is increased. The upper portion 63 and the lower portion 64 have planar sections that are in contact with the platform 1, the former, and the lower support element 10, the latter. It is also understood that other types of frictional engagement arrangements can also be employed. In one embodiment there are corresponding grooves. In yet other embodiments, these corresponding groves will have indicia associated with them. In some embodiments the indicia indicate angular position of the platform 1 in relation to the abutment 6.

The one or more strap accepting sections 7 are located on the abutment 6. The strap accepting sections 7 can serve as a guide for a strap 8. In some embodiments, there is a strap accepting section 7 on each of the projections 61 and on the center portion 62. The size of the strap accepting sections 7 can be changed according to need. In some embodiments, there are multiple strap accepting sections 7 of varying sizes on one of the projections 61, both of the projections 61, and/or the center portion 62. The strap accepting sections 7 can form a full enclosure, so that the strap is threaded through, or define a gap that will enable the strap 8 to be inserted therein (not shown). In some embodiments, the strap accepting section(s) 7 is merely an indentation in the abutment 6 (not shown).

The center tension member 4 and the periphery tension member 5 can comprise an adjustable clamping lever with a threaded member that engages the abutment 6. In other embodiments, the center tension member 4 and the periphery tension member 5 can comprise a knob with a threaded member. When the user tightens the center tension member 4 and/or the periphery tension member 5, it increases the pressure between the platform 1 and the upper portion 63. Some embodiments lack the center tension member 4 and there is an attachment between the platform 1 and the abutment 6 that allows for rotational movement. Other embodiments lack the periphery tension member 5.

The strap tensioning member 9 is used to tighten the strap 8 and secure the abutment 6 member to a column. In some embodiments, the strap tensioning member 9 is an endless loop ratchet. In other embodiments different types of tensioning devices can be used to secure the abutment 6 to the stable object such as a cambuckle or gunwale strap.

It is understood that the components can be comprise varying materials. These materials include, but are not limited to, steel, aluminum, other metals, plastics, composites, laminates, nylon, and combinations thereof.

During use a user will secure the abutment 6 to a column, post or other stable object. This can be done using the strap 8. The strap 8 is situated in or on the strap accepting sections 7 wrapped around the column, post or other stable object, and tightened until there is sufficient tension to secure the abutment 6 to the a column, post or other stable object. The tightening of the strap 8 can be achieved by the use of the strap tensioning member 9. If the object is a square column, the two projections 61 will abut surfaces of the square column, as shown in FIG. 1. If the object is an I-beam, one of the projections 61 will abut a surface while the other may hang in space. If the object is round or an irregular shape, certain parts of the projections 61 will abut the surfaces. While the projections 61 are shown as defining a V-shape, it is understood that the projections 61 may define a U-shape, a semicircle, or other shapes. The user can set the platform 1 to a desired position by adjusting the center tension member 4, the periphery tension member 5 and/or the lower tightening member 11. In order to rotate, the tension members 4, 5, and/or the lower tightening member 11 are loosened. The platform 1 is rotated about the center tension member 4, and the platform 1 is free to move about the periphery tension member 5 due to the curved slot 14. The rotation of the platform 1 will be transferred down the brace(s) 2 to the lower support element 10. Once the desired orientation is achieved, the user can tighten the center tension member 4, the periphery tension member 5 and/or the lower tightening member 11.

Figure 9:
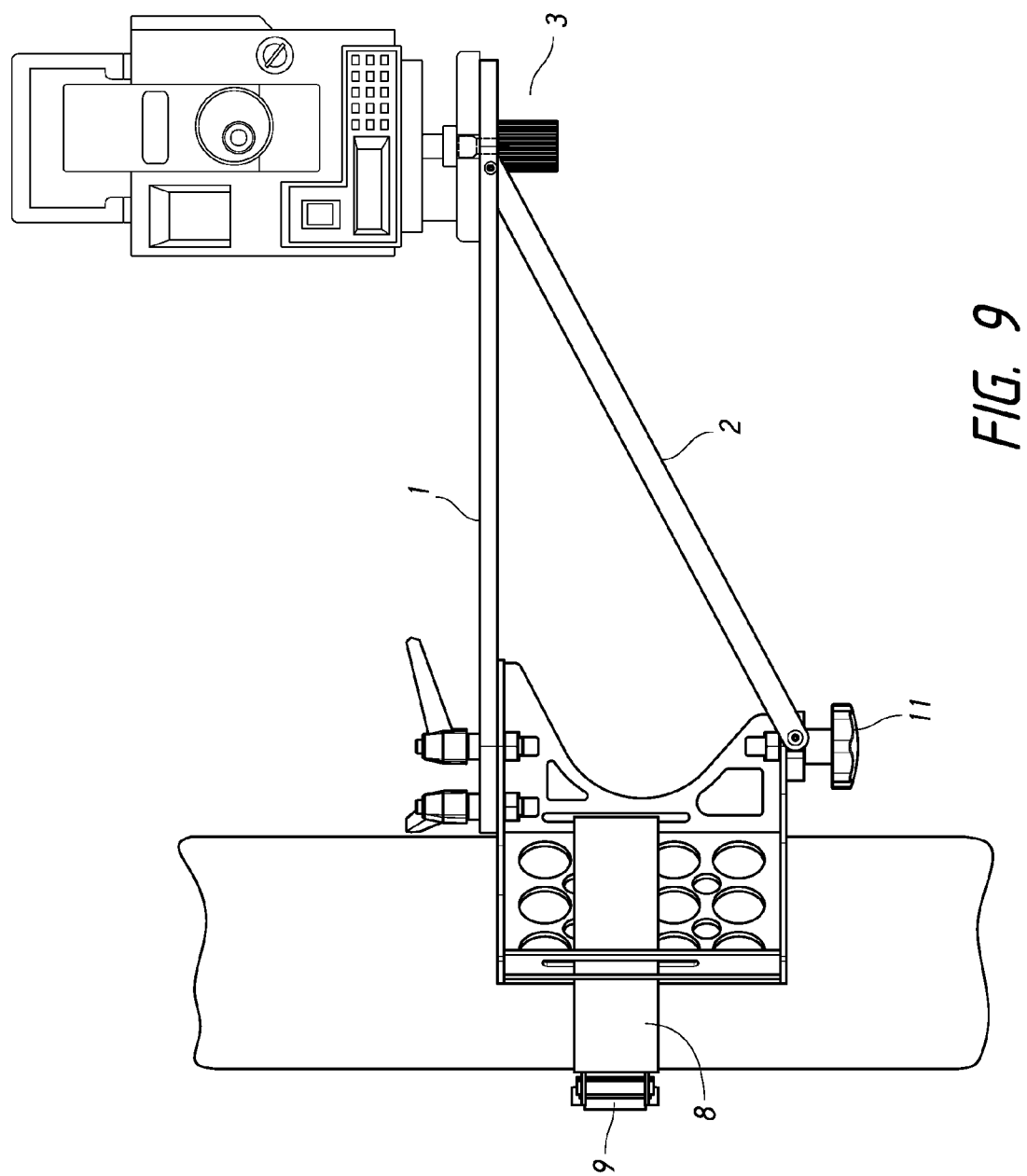
FIGS. 9-10 shows an embodiment of the column attachment with an attached device in different positions.
Figure 10:
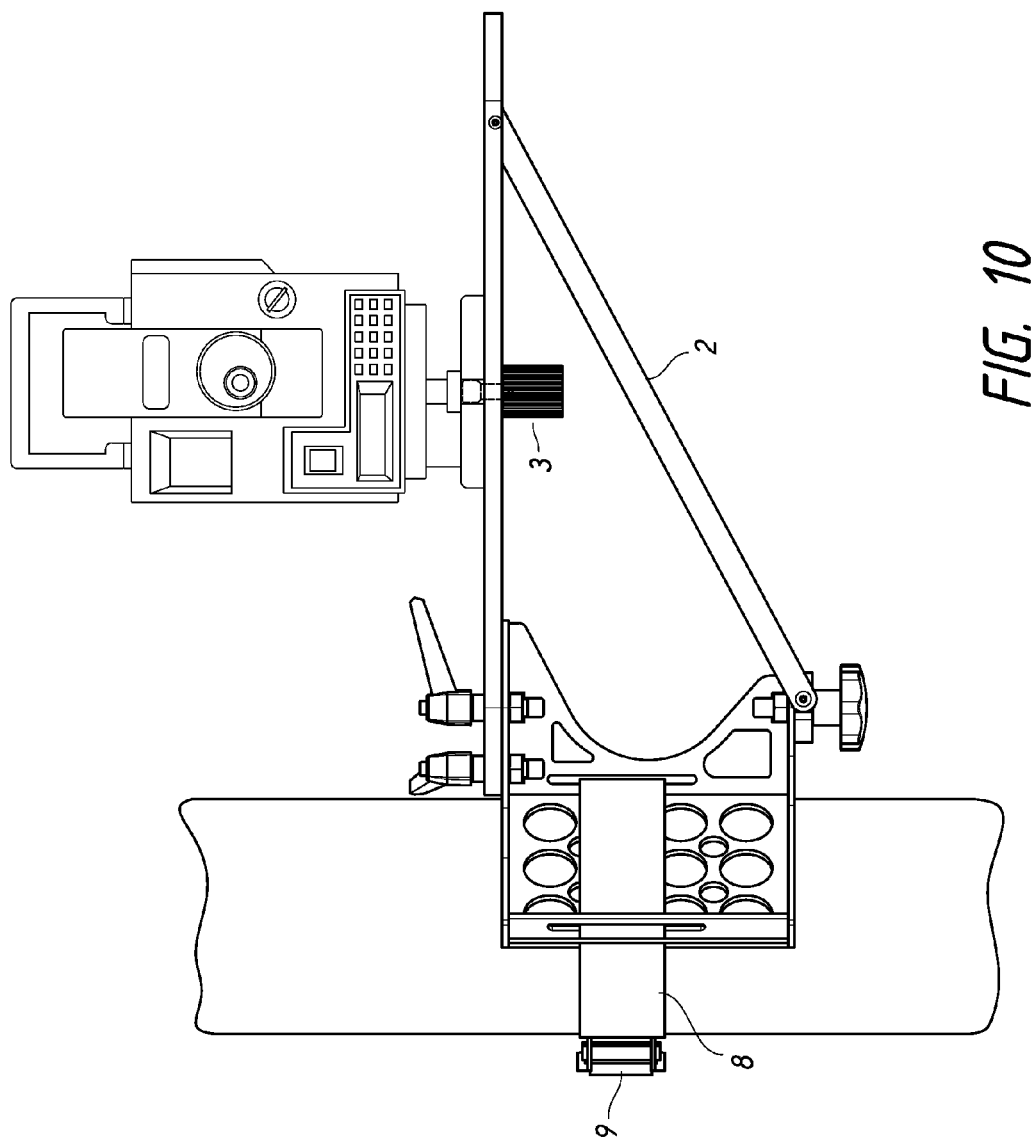

Referring to FIGS. 9 and 10, another degree of adjustment is provided by the securing element 3 and the slot 12. The securing element 3 is attached to the device. The user is able to slide the device along the length of the slot 12. When the user has arrived at the desired location, the user will tighten the securing element 3 such that the platform 1 will be located between the base of the device and the gripping portion 31. This arrangement will prevent movement of the device along the slot 12 as well as stabilize it in relation to the platform 1.

Depending on the embodiment, certain steps of methods described may be removed, others may be added, and the sequence of steps may be altered. Those skilled in the art will now see that certain modifications can be made to the apparatus and methods herein disclosed with respect to the illustrated embodiments, without departing from the spirit of the instant invention. And while the invention has been described above with respect to several embodiments, any element and/or step described in reference to any particular embodiment is hereby disclosed to be associated with any other embodiment of the invention. It is understood that the invention is adapted to numerous rearrangements, modifications, and alterations, and all such arrangements, modifications, and alterations are intended to be within the scope of the invention.

What is claimed is:

1. An apparatus comprising:
   an abutment comprising one or more projections;
   a center tension member, threadedly engaged with the abutment, and periphery tension member, threadedly engaged with the abutment;
   a platform comprising a slot a curved slot, and an aperture; and
   a securing element comprising a threaded securing portion;
   wherein, the periphery tension member extends through the curved slot, the center tension member extends through the aperture, and the securing element is able to slide along the slot.

2. The apparatus of claim 1, wherein each of the center tension member and the periphery tension member comprise an adjustable clamping lever.

3. The apparatus of claim 1, wherein the abutment further comprises one or more strap accepting sections.

4. The apparatus of claim 1, further comprising a lower support element and a lower tightening member; wherein the lower tightening member extends through the lower support element and is threadedly engaged with the abutment.

5. The apparatus of claim 1, further comprising a lower support element and one or more brackets, wherein the one or more brackets connect the lower support element and the platform.

6. The apparatus of claim 5, wherein the lower support element comprises a base and an arm extending from the base, and the one or more brackets are connected to the arm.

7. The apparatus of claim 1, wherein the securing element further comprises a gripping portion and a neck, and the neck is adapted to move through the slot.

8. An apparatus comprising:
an abutment;
a platform defining a slot and a curved slot;
a securing element comprising a neck;
a periphery tension member;
wherein the platform is attached to the abutment, the neck is configured to slide along the slot, and the periphery tension member extends through the curved slot and secures the platform to the abutment.

9. The apparatus of claim 8, further comprising a lower support element and a lower tightening member, wherein the lower tightening member secures the lower support element to the abutment.

10. The apparatus of claim 9, further comprising a brace connecting the lower support element to the platform, wherein the lower support element is configured to rotate relative to the abutment.

11. The apparatus of claim 8, wherein the abutment comprises two projections extending from a center portion, and the two projections define an angle that is less than or equal to 180 degrees.

12. The apparatus of claim 8 wherein the platform further defines a through hole in communication with the slot, the securing element further comprises a threaded element, and the through hole has a thread that corresponds with the threaded element.

* * * * *